United States Patent [19]

French et al.

[11] Patent Number: 5,468,283
[45] Date of Patent: Nov. 21, 1995

[54] HOLLOW FIBER MEMBRANE MODULES WITH TRANSVERSE GAS FLOW TAILORED FOR IMPROVED GAS SEPARATION

[75] Inventors: Erick M. French, Golden; James S. French, Evergreen, both of Colo.

[73] Assignee: Transfair Corporation, Wheatridge, Colo.

[21] Appl. No.: 278,421

[22] Filed: Jul. 21, 1994

[51] Int. Cl.$^6$ .......................... B01D 53/22; B01D 63/02
[52] U.S. Cl. ........................ 95/45; 96/8; 96/10
[58] Field of Search ............ 95/45–56; 96/7–10; 210/321.78, 321.79, 321.8, 321.87, 321.88, 321.89

[56] References Cited

U.S. PATENT DOCUMENTS

| | | | |
|---|---|---|---|
| 2,618,357 | 11/1952 | Harlow | 96/7 |
| 3,422,008 | 1/1969 | McLain | 96/10 X |
| 3,455,460 | 7/1969 | Mahon et al. | 210/321.88 |
| 3,475,331 | 10/1969 | McLain | 210/321.88 |
| 3,494,465 | 2/1970 | Nyrop | 96/7 X |
| 4,031,012 | 6/1977 | Gics | 96/8 X |
| 4,124,510 | 11/1978 | Joh | 210/321 B |
| 4,225,439 | 9/1980 | Spranger | 210/321.89 |
| 4,427,424 | 1/1984 | Charpin et al. | 96/8 |
| 4,497,640 | 2/1985 | Fournié | 96/8 X |
| 4,883,023 | 11/1989 | Tsang et al. | 96/8 X |
| 4,917,797 | 4/1990 | Inacio et al. | 210/321.78 X |
| 5,015,269 | 5/1991 | Garrett et al. | 96/8 X |
| 5,032,269 | 7/1991 | Wollbeck et al. | 210/321.89 X |
| 5,041,220 | 8/1991 | Lee et al. | 210/321.8 |
| 5,211,728 | 5/1993 | Trimmer | 96/8 X |
| 5,230,862 | 7/1993 | Berry et al. | 210/321.79 X |
| 5,282,964 | 2/1994 | Young et al. | 210/321.8 |

FOREIGN PATENT DOCUMENTS

| | | | |
|---|---|---|---|
| 0024718 | 3/1981 | European Pat. Off. | 96/8 |
| 4039967 | 6/1972 | Germany | 96/7 |
| 3-063434 | 3/1991 | Japan | 96/10 |

*Primary Examiner*—Robert Spitzer
*Attorney, Agent, or Firm*—John R. Flanagan

[57] ABSTRACT

A hollow fiber membrane gas separation module includes an elongated pressure vessel defining an interior cavity and having at least one end with a permeate exit flow region, a core of short hollow fiber membranes extending in the interior cavity, having lengths falling within a range of from 3 to 60 centimeters and being of the type for separation of gases, and external feed and retentate gas manifolds defining flow chambers and being attached to and overlying spaced side portions of the pressure vessel. The external feed and retentate manifolds permit tailoring of the transverse gas flow through the hollow fiber membranes of the core so as to improve gas separation performance of the hollow fibers.

69 Claims, 5 Drawing Sheets

HOLLOW FIBER MEMBRANE MODULES WITH TRANSVERSE GAS FLOW TAILORED FOR IMPROVED GAS SEPARATION

TECHNICAL FIELD

The present invention generally relates to the separation of gases using modules having a core of hollow fiber membranes and, more particularly, is concerned with hollow fiber membrane modules having transverse gas flow tailored through the core of short hollow fiber membranes of the module to improve gas separation performance of the hollow fibers.

BACKGROUND ART

A traditional hollow fiber membrane module for gas separation typically has a feed gas inlet at one end, a retentate gas outlet at an opposite end and a permeate gas outlet therebetween and along a side of the module. The feed gas inlet and retentate gas outlet are thus separated from one another by the full length of the module, providing a long distance for the feed gas to travel from the inlet to the outlet.

Heretofore, most gas separation modules have been designed to provide co-current or counter-current gas flow patterns through their hollow fiber membrane core in order to maximize the separation of the fast permeate portion of the feed gas and the high concentration thereof in the permeate gas. Such gas flow patterns through the hollow fiber membrane core may produce high concentrations of a constituent permeate gas, for example, from 95% to 99.99% $N_2$ or $O_2$.

The need for a suitable $O_2/N_2$ selective, high permeability, hollow fiber membrane gas separation module for use within a diesel automobile, bus or other combustion vehicles, has recently been emphasized by Geoff R. Rigby and Harry C. Watson in a paper entitled "Application of membrane gas separation to oxygen enrichment of diesel engines" appearing in *Journal of Membrane Science*, 87 (1994) 159–169. However, as recognized by the inventors herein, before a suitable hollow fiber membrane gas separation module adapted for $O_2$ enrichment can be practically applied, several important criteria will have to be met. The gas separation module must be inexpensive to produce and easy to service and/or replace due to fouling, have a high permeate flow rate, work effectively under relatively low pressures, and be able to fit within a small volume. Previous designs have met some but not all of these important criteria.

One possible gas separation module design is disclosed in U.S. Pat. No. 5,174,900 to Nichols et al. This module has an outer pressure vessel and membrane wafers placed inside the pressure vessel. The membrane wafers are in the form of mats composed of hollow fibers woven into a textile. These membrane wafers are stacked together to a suitable height in the pressure vessel and sealed around their outside edge, making circular disks. The gas separation module is fed transversely, allowing high flow rates.

This gas separation module design meets many of the important criteria for a good oxygen enrichment membrane module. For example, the membrane wafers in the module vessel may be removed and replaced. However, overall, this gas separation module design is expensive and complex and not suitable for low cost construction.

Another possible gas separation module design is disclosed in U.S. Pat. No. 5,051,113 to Nemser. This gas separation module provides $O_2$ enriched air for an internal combustion engine. The module has an outer pressure vessel filled with axially extending hollow fiber membranes each having a high permeability selective layer to separate oxygen from air.

While this gas separation module design appears to be simple and easy to produce, it would occupy a volume much too large to fit into the engine compartment of a vehicle. In addition, the gas separation module is not designed to run under low pressures, such as less than 100 psi. Lastly, no way is provided to service the membrane or to replace it should it become fouled.

Thus, a need exists for improvements to meet the aforementioned important criteria in gas separation module design, particularly for combustion applications.

DISCLOSURE OF INVENTION

The present invention provides a hollow fiber membrane gas separation module designed for tailoring transverse gas flow through a core of short hollow fiber membranes so as to provide improved gas separation performance, particularly for combustion applications. As used herein, "short" is defined as lengths of hollow fiber membranes falling within a range of from 3 to 60 centimeters. The gas separation module brought about by the module construction and gas flow tailoring of the present invention meets the aforementioned criteria, namely, that the module be inexpensive to produce and easy to service and/or replace due to fouling, have a high permeate flow rate, work effectively under relatively low pressures, and be able to fit within a small volume.

Accordingly, the present invention is directed to a hollow fiber membrane gas separation module which comprises an elongated pressure vessel and a core of short hollow fiber membranes. The pressure vessel has a pair of opposite ends and an interior cavity formed between the opposite ends. At least one of the opposite ends of the vessel defines an open region thereof. The core of short hollow fiber membranes is disposed in the interior cavity of the pressure vessel. The core includes at least one end support member mounted across the one end of the vessel defining the open region thereof and a multiplicity of short hollow fiber membranes of a type for separating gases extending through the interior cavity of the pressure vessel. Each of the hollow fiber membranes has at least one open end, a hollow interior bore communicating with the open end and an exterior surface defining a membrane gas separation area within the interior cavity of the pressure vessel. Each hollow fiber membrane at the open end thereof is attached to the end support member such that the hollow interior bore of each hollow fiber membrane is positioned in communication with the open region at the one end of the pressure vessel.

The hollow fiber membrane gas separation module also comprises means for guiding flow of feed gas under a predetermined pressure from externally of the pressure vessel into the interior cavity thereof and from the interior cavity thereof to externally of the pressure vessel such that the feed gas enters the interior cavity through a first side portion of the pressure vessel, flows across the interior cavity in transverse relation to the hollow fiber membranes therein and contacts the exterior surfaces of the hollow fiber membranes defining the membrane gas separation areas so as to produce a flow of a permeate portion of the feed gas exiting the pressure vessel through the open region at the one end thereof after traveling through the interior bores of the hollow fiber membranes and a flow of a retentate portion of the feed gas exiting the interior cavity through a second side portion of the pressure vessel separate from the first side portion thereof after traveling across the interior cavity outside of the hollow fiber membranes.

The flow guiding means includes at least one feed manifold connected to and overlying the first side portion of the pressure vessel externally thereof and defines a feed flow chamber therewith. The feed manifold has at least one outer perforation defined therein for introducing the flow of feed gas in a first stream thereof into the feed flow chamber from externally of the feed manifold. The flow guiding means also includes a plurality of inner perforations defined in the first side portion of the pressure vessel for diverting the first stream into a plurality of second streams and introducing the second streams into the interior cavity of the pressure vessel from the feed flow chamber of the feed manifold such that the second streams distribute the flow of feed gas throughout a greater volume of the interior cavity of the pressure vessel so as to produce a greater degree of mixing and contact of the flow of feed gas with the membrane gas separation areas defined by the exterior surfaces of the hollow fiber membranes than otherwise would be produced by the first stream introduced directly into the interior cavity.

The pressure vessel can be of different cross-sectional shapes such as a circular or polygonal depending upon the particular application. Further, depending upon the particular application, the lengths of the short hollow fiber membranes preferably can fall within a range of from 3 to 30 centimeters or still more preferably within a range of from 3 to 20 centimeters.

The flow guiding means of the module also includes a plurality of apertures defined in the second side portion of the pressure vessel spaced from a first side portion thereof. The size and number of the apertures can be selected to provide sufficient back pressure to keep the pressure vessel pressurized at the desired feed gas flow rate through the module. Further, the flow guiding means of the module can include at least one retentate manifold connected to and overlying the second side portion of the pressure vessel externally thereof. The retentate manifold defines a retentate flow chamber with the second side portion of the pressure vessel which provides communication between the plurality of apertures in the second side portion of the housing and at least one outer aperture defined in the retentate manifold for discharging flow of retentate gas from the interior cavity through the inner apertures and then through the retentate flow chamber to externally of the retentate manifold such that the greater degree of mixing and contact of the feed gas flow with the membrane gas separation areas of the hollow fiber membranes produced by the inner perforations in the first side portion of the housing is better augmented by the discharging of retentate gas flow from the interior cavity through the plurality of apertures in the second side portion of the housing than would be augmented by the discharging of retentate gas flow directly from the interior cavity of the housing through the outer aperture in the retentate manifold.

The pressure vessel includes an elongated housing and a pair of end closures attached over the opposite ends of said housing. The flow guiding means also includes a permeate flow chamber formed between at least one of the end closures and the one end support member of the core. A hole can be defined in the one end closure for exhausting flow of permeate gas from the interior bores of the hollow fiber membranes to externally of the pressure vessel.

Also, the present invention is directed to a hollow fiber membrane gas separation module wherein the above-defined core of hollow fiber membranes is removable and replaceable in the above-defined pressure vessel. The one end closure is preferably threadably attached to the one end of the housing of the vessel. First and second annular seal elements are provided in the end of the housing for creating respective seals between the core and housing and between the removable end closure and housing.

More particularly, the removable and replaceable core preferably includes a pair of the end support members each having an exterior side and an interior side with each of the hollow fiber membranes at the opposite open ends thereof being attached to the end support members such that the hollow fiber membrane extends between the interior sides of the end support members and the interior bore of the hollow fiber membrane is provided in communication with the exterior sides of the end support members. The core also includes an elongated substantially rigid support structure extending between and connected at opposite ends to the end support members so as to position the end support members in a predetermined fixed spaced relationship from one another with the hollow fiber membranes extending therebetween.

Further, the present invention is directed to the above-defined pressure vessel and the above-defined core of hollow fiber membranes employed by the gas separation module as defined above.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

BEST MODE FOR CARRYING OUT THE INVENTION

Figure 1:
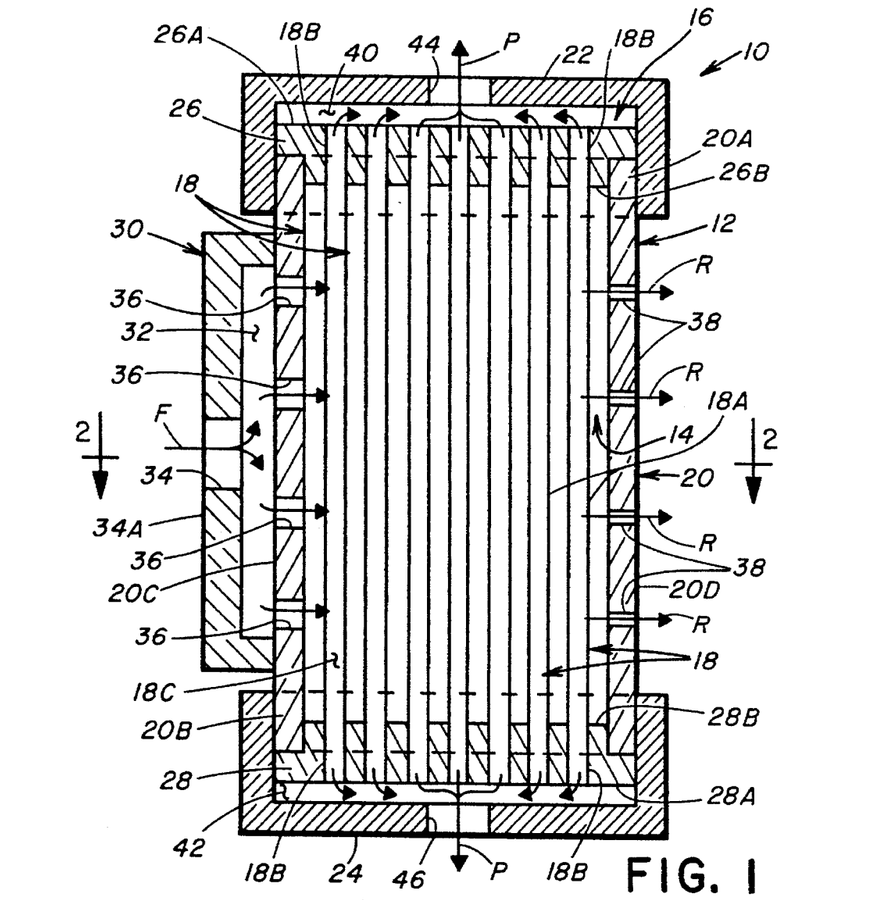
FIG. 1 is an axial sectional view of a first embodiment of a hollow fiber membrane gas separation module of the present invention showing a single feed manifold applied to a pressure vessel of the module and a core of hollow fiber membranes connected permanently with the pressure vessel.
Figure 2:
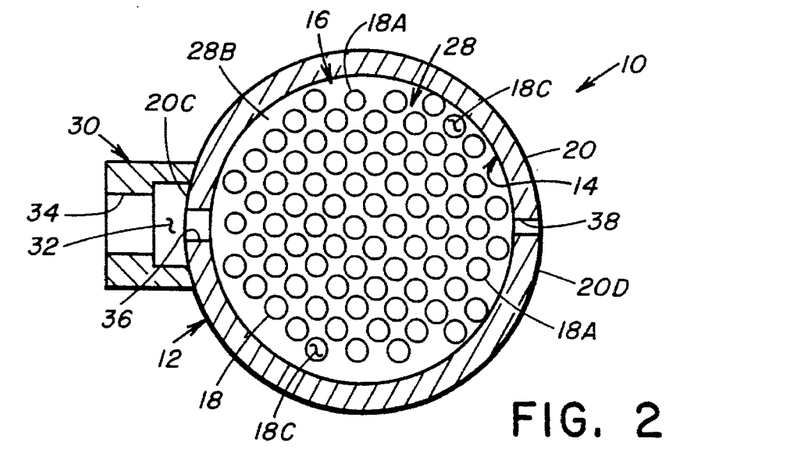
FIG. 2 is a cross-sectional view of the first embodiment of the module taken along line 2—2 of FIG. 1.

Referring to the drawings, and particularly to FIGS. 1 and 2, there is illustrated a first embodiment of a hollow fiber membrane gas separation module, generally designated 10, having a construction in accordance with the principles of the present invention. As will be described hereinafter, the gas separation module 10 has improved features which are designed to tailor the pattern of transverse gas flow through the module so as to improve the gas separation performance thereof.

In its basic components, the first embodiment of the gas separation module 10 shown in FIGS. 1 and 2 includes an elongated pressure vessel 12 forming an interior cavity 14 and a core 16 of short hollow fiber membranes 18 disposed in the interior cavity 14. The pressure vessel 12 includes a substantially rigid tubular housing 20 having a pair of opposite ends 20A, 20B with the interior cavity 14 defined by the housing 20 extending between its opposite ends. The opposite ends 20A, 20B of the housing 20 define open regions of the pressure vessel 12. For some applications, these open regions can be utilized without the addition of further components for collecting and guiding flow of gas therefrom. There are other applications, however, where it is necessary to attach suitable elements, such as end caps or closures 22, 24, to the opposite ends 20A, 20B of the housing 20 and across the open regions so that other equipment components, such as fittings and hoses, may be readily connected to the module 10.

In the first and second embodiments of gas separation module 10 illustrated respectively in FIGS. 1–2 and FIGS. 3–4, the hollow fiber membrane core 16 is permanently or non-removably attached to the interior of the pressure vessel 12 of the module 10. The core 16 is formed of a large number of the hollow fiber membranes 18 which are of a type suitable for separating gases. The hollow fiber membranes 18 are provided as either individual fibers or in groups of fibers. The exterior surfaces 18A of the hollow fiber membranes 18 define the membrane gas separation areas of the core 16. The fiber membranes 18 have opposite open ends 18B and hollow interior bores 18C which communicate with the opposite open ends 18B. It should be noted here that to assist in promoting a clear understanding of the present invention, the hollow fiber membranes 18 have been represented diagrammatically and in greatly exaggerated form as to their diameter size in FIGS. 1, 3 and 8–11.

Because of the occurrence of substantial interior bore backpressure in relatively long hollow fibers, a gas separation module having the constructions of the present invention, as will be described hereinafter, is functionally limited to use of cores 16 employing hollow fiber membranes 18 that are relatively short in length. As used herein, "short" is defined as lengths of hollow fiber membranes 18 falling within a range of from 3 to 60 centimeters. Further, depending upon the particular application, the lengths of the hollow fiber membranes 18 can preferably fall within a range of from 3 to 30 centimeters or still more preferably within a range of from 3 to 20 centimeters.

The hollow fiber membrane core 16 also includes at least one (see FIG. 11) but preferably a pair of end support members 26, 28 in the form of substantially rigid discs or end plates of potted material which are mounted across and over the respective opposite ends 20A, 20B of the housing 20. The end support members 26, 28 each have respective exterior and interior sides 26A, 26B and 28A, 28B. Each of the hollow fiber membranes 18 at the opposite open ends 18B thereof are attached to and embedded in the end support members 26, 28 such that the hollow fiber membranes 18 extend between the interior sides 26B, 28B of the end support members 26, 28 and the interior bores 18C of the hollow fiber membranes 18 are provided in communication with the exterior sides 26A, 28A of the end support members 26, 28.

The gas separation module 10 also includes various means which cooperate together for guiding flow of feed gas under a predetermined pressure from externally of the housing 20 of the pressure vessel 12 into the interior cavity 14 thereof and from the interior cavity 14 of the housing 20 to externally of the pressure vessel 12. The flow guiding means includes at least one feed manifold 30 located externally of the pressure vessel 12 and connected to and overlying a first side portion 20C of the housing 20 of the vessel 12. The feed manifold 30 defines a feed flow chamber 32 with the one side portion 20C of the housing 20. The feed manifold 30 includes at least one outer perforation 34 defined in an outer wall 34A for introducing the flow of feed gas F in a first stream thereof into the feed flow chamber 32 from externally of the feed manifold 30. The flow guiding means also includes a plurality of inner perforations 36 defined in the first side portion 20C of the housing 20 of the pressure vessel 12. The inner perforations 36 are spaced from one another in opposite directions from the location of the outer perforation 34 for diverting the first stream into a plurality of second streams. The second streams are introduced by the inner perforations 36 into the interior cavity 14 of the housing 20 from the feed flow chamber 32 of the feed manifold 30 such that the second streams distribute the flow of feed gas throughout a greater volume of the interior cavity 14 so as to produce a greater degree of mixing and contact of the flow of feed gas with the membrane gas separation areas defined by the exterior surfaces 18A of the hollow fiber membranes 18 than otherwise would be produced if the first stream was introduced directly into the interior cavity 14.

The flow guiding means of the module 10 also includes a plurality of flow exit apertures 38 defined in a second side portion 20D of the housing 20 of the pressure vessel 12 being spaced from a first side portion 20C thereof. The size and number of the inner perforations 36 and exit apertures 38 can be selected so as to optimize and tailor gas flow and mixing conditions for the particular application of the module 10. Also, the size and number of the exit apertures 38 can be selected to provide sufficient back pressure to keep the module 10 pressurized at the desired feed gas flow rate through the module 10.

The flow guiding means of the gas separation module 10 further includes at least one and preferably a pair of opposite permeate flow chambers 40, 42 formed between the end closures 22, 24 and the end support members 26, 28 of the core 16. Also, ports or holes 44, 46 are defined through the respective end closures 22, 24 for exhausting flow of permeate gas from the interior bores 18C of the hollow fiber membranes 18 to externally of the pressure vessel 12.

Thus, in view of the above-described arrangement of the flow guiding means of the module 10, referring again to FIG. 1 the feed gas F enters the interior cavity 14 in the second streams thereof through the first side portion 20C of the housing 20 and flows across the interior cavity 14 in transverse relation to the hollow fiber membranes 18 therein and contacts the exterior surfaces 18A of the hollow fiber membranes 18 defining the membrane gas separation areas. Such transverse flow and contact with the hollow fiber membranes 18 produces a flow of a permeate portion P of the feed gas exiting the housing 20 through the open regions at open end 20A, 20B thereof after traveling through the interior bores 18C of the hollow fiber membranes 18 and a flow of a retentate portion R of the feed gas exiting the interior cavity 14 through the second side portion 20D of the housing 20 after traveling across the interior cavity 14 outside of the hollow fiber membranes 18.

Figure 3:
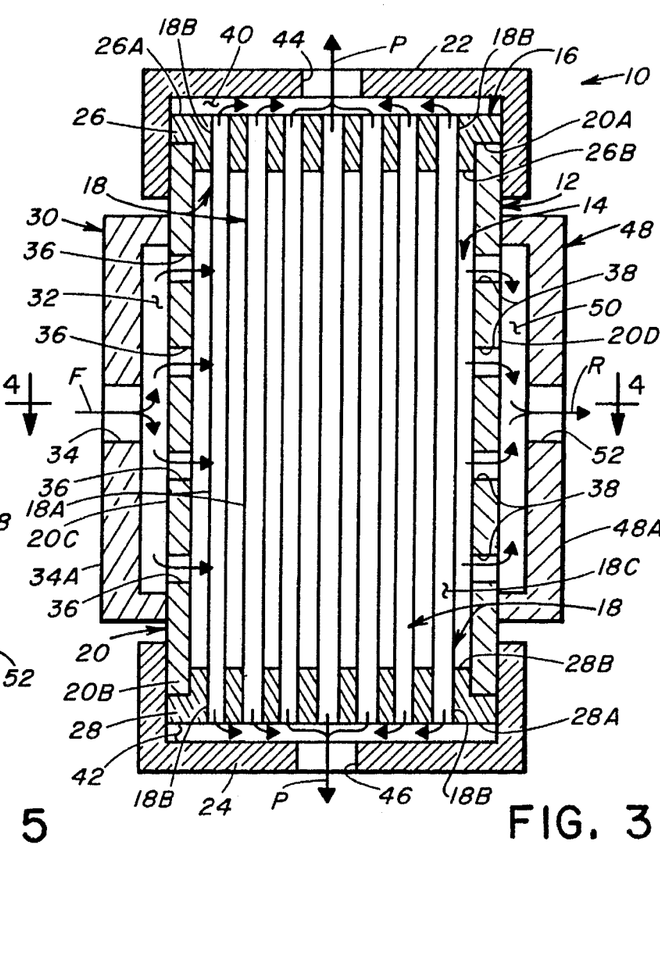
FIG. 3 is an axial sectional view of a second embodiment of a hollow fiber membrane gas separation module of the present invention showing single feed and retentate manifolds applied to the pressure vessel of the module and a core of hollow fiber membranes connected permanently with the pressure vessel.
Figures 4, 5:
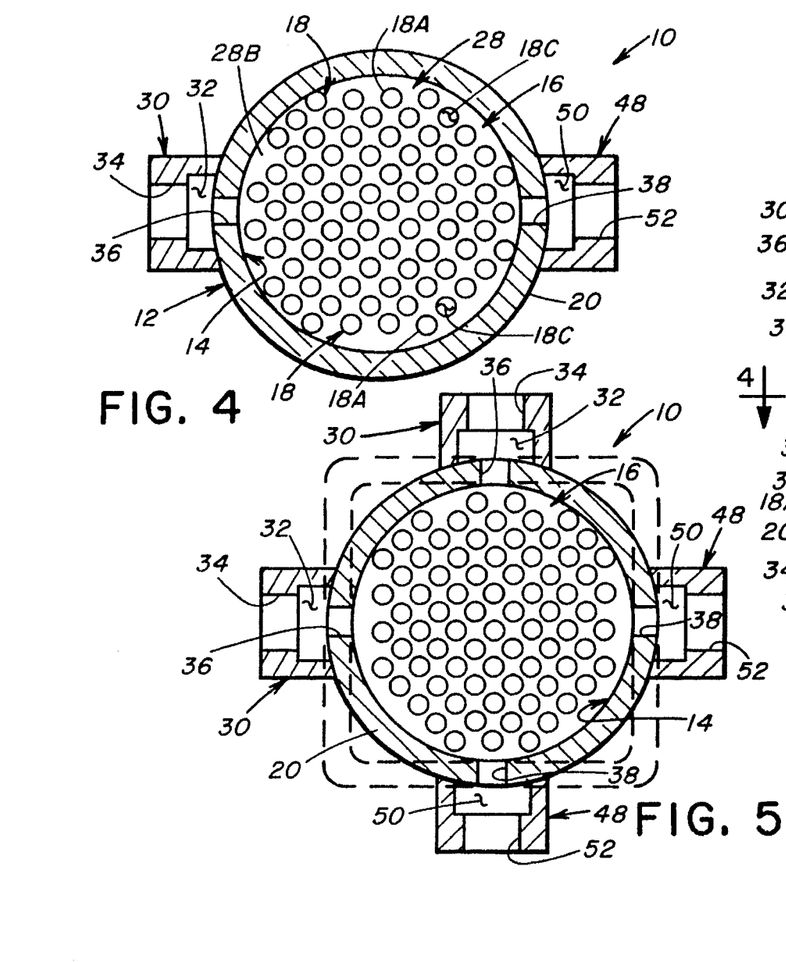
FIG. 4 is a cross-sectional view of the second embodiment of the module taken along line 4—4 of FIG. 3.
FIG. 5 is a view similar to that of FIG. 4 but showing multiple feed and retentate manifolds applied to the pressure vessel of the module.

Referring to FIGS. 3 and 4, there is illustrated the second embodiment of the gas separation module 10 of the present invention. The main difference of the second embodiment from the first embodiment is the addition of a retentate manifold 48 to the flow guiding means on the pressure vessel 12. The retentate manifold 48 is disposed externally of the pressure vessel 12 and connected to and overlying the second side portion 20D of the housing 20. The retentate manifold 40 defines a retentate flow chamber 50 with the second side portion 20D of the housing 20 so as to provide communication between the plurality of exit apertures 38 in the second side portion 20D with at least one outer aperture 52 defined in an outer wall 48A of the retentate manifold 48. The flow of retentate gas R discharges from the interior cavity 14 through the exit apertures 38 and then through the retentate flow chamber 50 to externally of the retentate manifold 48 such that the greater degree of mixing and contact of the feed gas flow with the membrane gas separation areas of the hollow fiber membranes 18 produced by the inner perforations 36 in the first side portion 20C of the housing 20 is better augmented by the discharging of retentate gas flow from the interior cavity 14 through the plurality of apertures 38 in the second side portion 20D of the housing 20 than would be augmented by the discharging of retentate gas flow directly from the interior cavity 14 of the housing 20 through the outer aperture 52 in the retentate manifold 48. As seen in FIGS. 3 and 4, the second side portion 20D of the housing 20 and the retentate manifold 48 connected thereto can be located directly opposite from the first side portion 20C of the housing 20 and the feed manifold 30 connected thereto. Other arrangements are equally possible.

FIG. 5 illustrates the gas separation module 10 with multiple feed and retentate manifolds 30, 48 applied to the housing 20 of the pressure vessel 12. The number of and space provided between the respective feed and retentate manifolds 30, 48 can be selected so as to optimize gas flow and mixing conditions for the particular application. It should also be realized that the gas separation modules of the present invention can be connected together in series or parallel relation or in combinations thereof. Also, as shown in FIGS. 2, 4 and 5, the tubular housing 20 of the pressure vessel 12 preferably has a circular cross-sectional shape. However, the tubular housing 20 can take other cross-sectional shapes, such as triangular, square, hexagonal or some other polygonal shape.

The first and second embodiments of the gas separation module 10 described above meets all of the criteria mentioned earlier as being important for practical application of the module within a diesel automobile, bus or other combustion process to provide $O_2$ enrichment of the air flow delivered thereto. The provision of external feed and retentate manifolds 30, 48 on the exterior of the pressure vessel 12 permits the use of materials and manufacturing techniques to produce the pressure vessel 12 of the module 10 which are sufficiently low in cost so that the entire module 10 can be employed in a dirty environment and then removed, discarded and replaced when expected fouling of the membrane core 16 occurs. Further, the provision of the external feed and retentate manifolds 30, 48 and the outer and inner perforations 38, 36 and apertures 52, 38 in the manifolds 30, 48 and the pressure vessel 12 faciliate the employment of high feed flow rates and low pressures and the provision of modules that are able to fit within small volumes of space.

Figure 6:
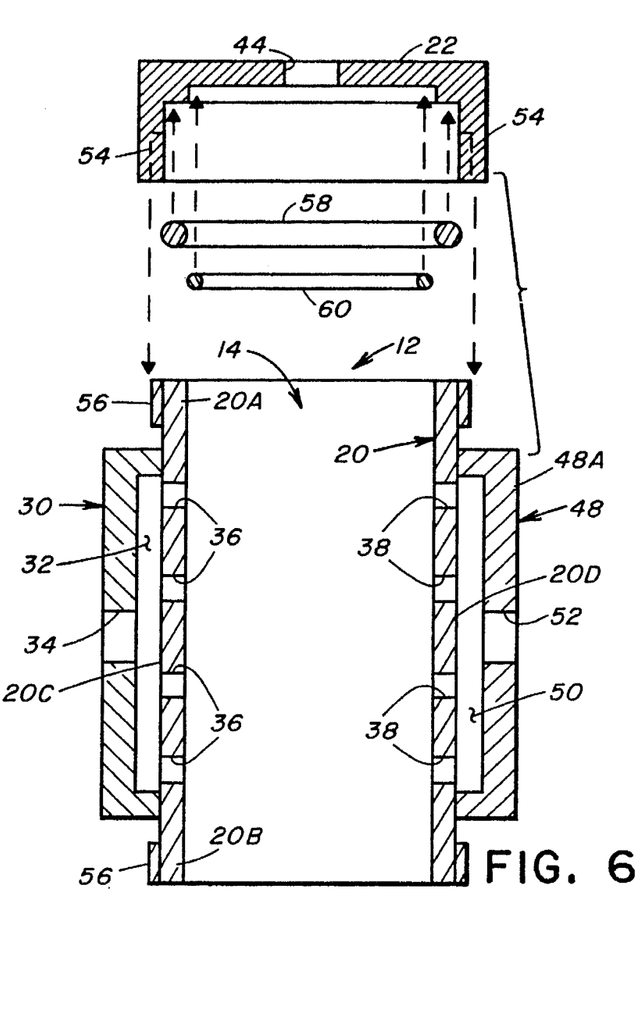
FIG. 6 is an exploded axial sectional view of a third embodiment of a hollow fiber membrane gas separation module of the present invention showing a pressure housing and one of a pair of end caps removable from opposite ends of the pressure housing but not showing the hollow fiber membrane core which removably and replaceably fits into the pressure housing.
Figure 7:
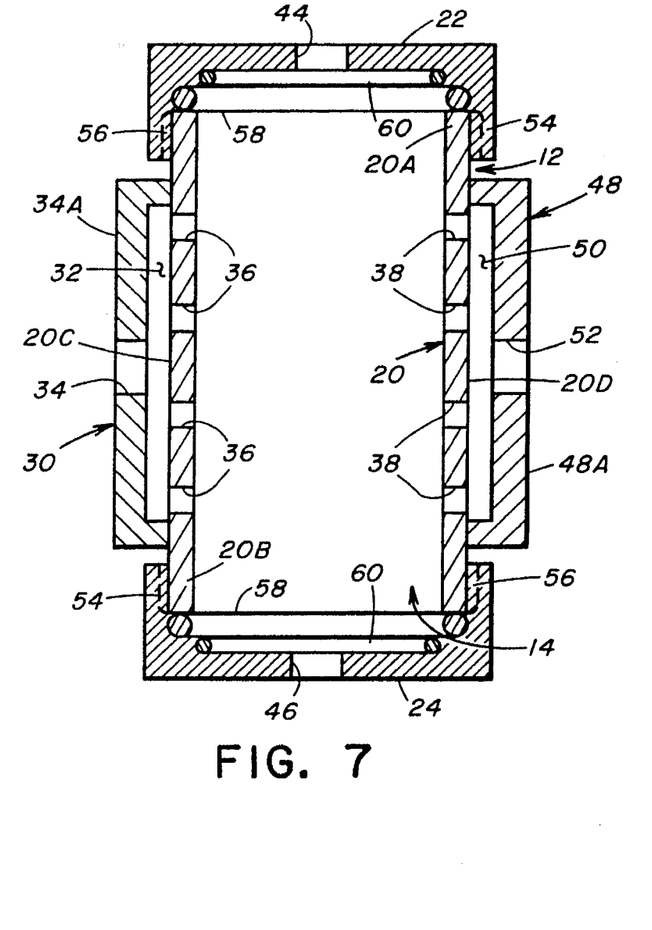
FIG. 7 is an assembled axial sectional view of the third embodiment of the gas separation module of the present invention.

Referring to FIGS. 6 and 7, there is illustrated a third embodiment of the hollow fiber membrane gas separation module 10 of the present invention. In this embodiment, the gas separation module 10 employs a removable and replaceable hollow fiber membrane core 16, such as one of the cores 16 shown in FIGS. 8–11. This embodiment of the module 10 also meets all of the important criteria mentioned earlier and instead of total replacement of the module 10, it promotes further efficiencies and cost savings for users by only requiring removal and replacement of the core 16 when it becomes fouled with dirt and other foreign matter.

In the embodiment illustrated in FIGS. 6 and 7, the module 10 includes the pressure housing 20 with feed and retentate manifolds 30, 48 as described above with reference to FIGS. 3 and 4. The difference now is that either one or both of the end closures 22, 24 are removable from opposite ends 20A, 20B of the pressure housing 20. It is to be understood that it is only necessary that one of the end closures 22, 24 be removable. As an example only, the end closures 22, 24 (since the end closures 22, 24 are identical, only the one end closure 22 is shown in FIG. 6) and the opposite ends 20A, 20B of the housing 20 have respective annular threaded portions 54, 56 which permit screwing and unscrewing the end closures 22, 24 onto and from the pressure housing 20. It should be readily understood that it is within the purview of the present invention that other suitable means can be provided to removably attach the end closures 22, 24 to the housing 20.

Further, seal means such as in the form of first and second annular seal elements, or O-rings, 58, 60 may be provided for seating in each of the opposite ends 20A, 20B of the housing 20 for creating respective seals between the opposite end support members 26, 28 of the core 16 and the housing 20 and between the removable end closures 22, 24 and the housing 20. (Only the first and second seal elements 58, 60 associated with the one end closure 22 are shown in FIG. 6.) It should be understood that the first and second annular seal elements 58, 60 can be fabricated together as a single element. Alternatively, other suitable techniques are known for providing seals between the end closures 22, 24 and the housing 20 and between the core 16 and the housing 20.

Figure 8:
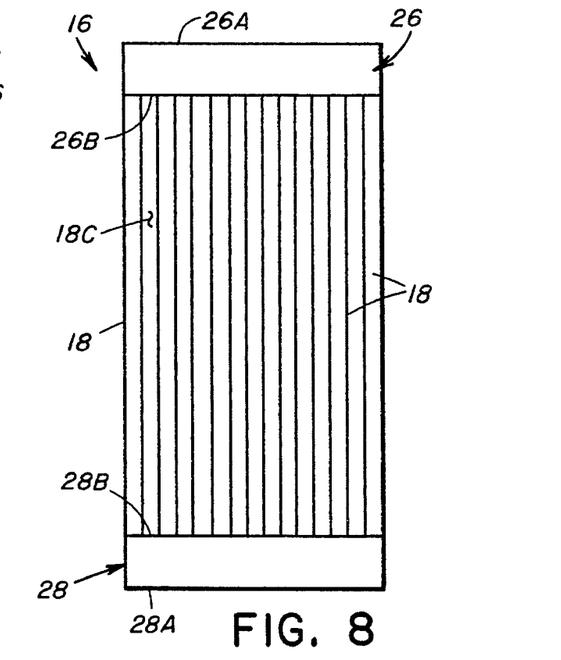
FIG. 8 is a side elevational view of a first embodiment of a replaceable hollow fiber membrane core which may be employed by the gas separation module of FIG. 6.
Figure 9:
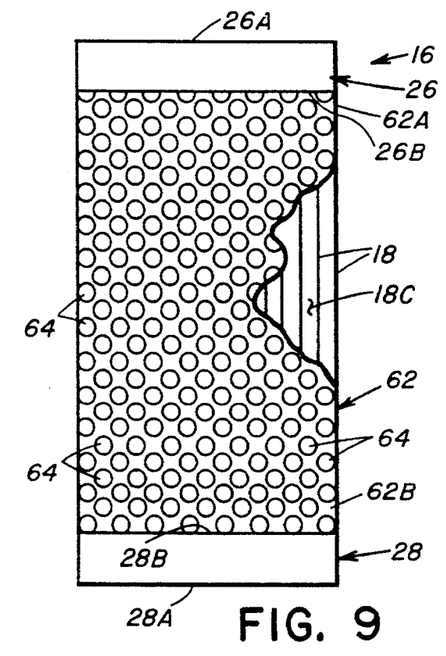
FIG. 9 is a side elevational view of a second embodiment of a replaceable hollow fiber membrane core which may be employed by the gas separation module of FIG. 6.
Figure 10:
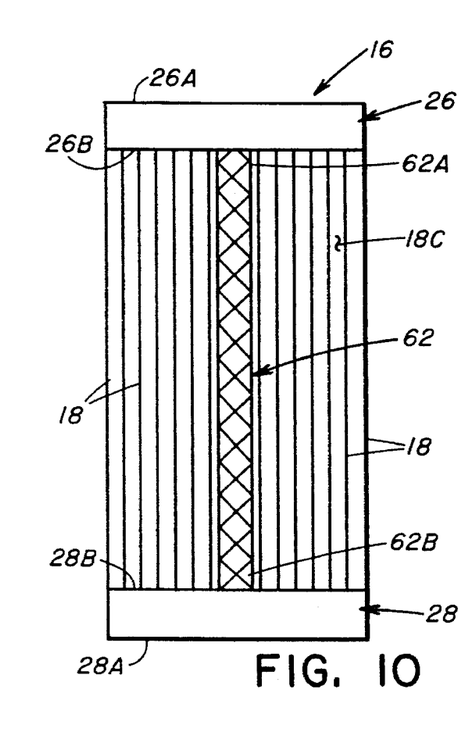
FIG. 10 is a side elevational view of a third embodiment of a replaceable hollow fiber membrane core which may be employed by the gas separation module of FIG. 6.
Figure 11:
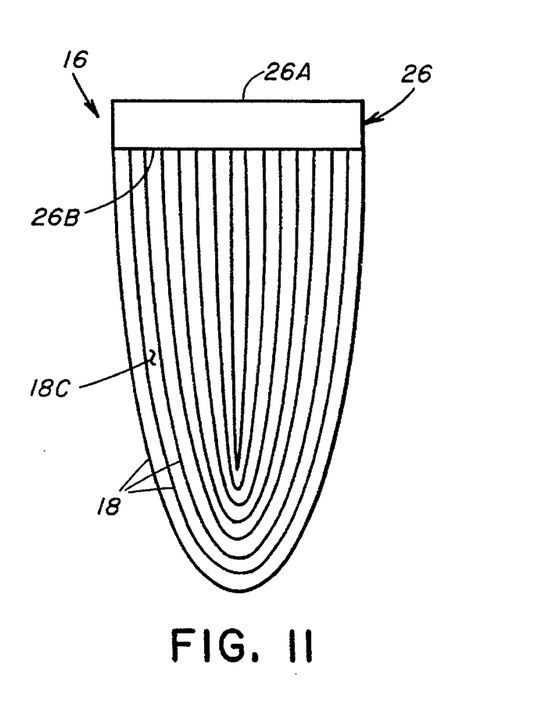
FIG. 11 is a side elevational view of a fourth embodiment of a replaceable hollow fiber membrane core which may be employed by the gas separation module of FIG. 6.

Referring to FIGS. 8–11, there is illustrated different embodiments of the replaceable hollow fiber membrane core 16 which can be employed in the gas separation module 10 of FIGS. 6 and 7. FIG. 8 shows a removable and replaceable core 16 which includes the pair of the end support members 26, 28 each having exterior and interior sides 26A, 26B and 28A, 28B and the hollow fiber membranes 18 attached at their opposite open ends 18B to the respective end support members 26, 28 such that the hollow fiber membranes 18 extend between the interior sides 26B, 28B of the end support members 26, 28 and the interior bores 18C of the hollow fiber membranes 18 are provided in communication with the exterior sides 26A, 28A of the end support members 26, 28. FIGS. 9 and 10 show removable and replaceable cores 16 which include the same end support members 26, 28 and the hollow fiber membranes 18 as in FIG. 8, but in addition thereto include an elongated substantially rigid support structure 62 extending between and connected at opposite ends 62A, 62B to the end support members 26, 28 so as to position the end support members in a predetermined fixed spaced relationship from one another with the hollow fiber membranes 18 extending between the end support members 26, 28. In FIG. 9, the rigid support structure 62 is in the configuration of an elongated tubular screen or sleeve having a multiplicity of perforations 64 defined therein. The sleeve 62 extends between and is connected at its opposite ends 62A, 62B with peripheral portions of the end support members 26, 28. In FIG. 10, the rigid support structure 62 is at least one elongated post extending between and connected at opposite ends 62A, 62B with opposite portions of the end support members 26, 28. In FIG. 11, there is only one end support member 26 used and the hollow fiber members 18 are arranged in generally U-shaped configurations such that their pairs of opposite open ends 18B are attached to the same end support member 26.

Figures 12, 13, 14:
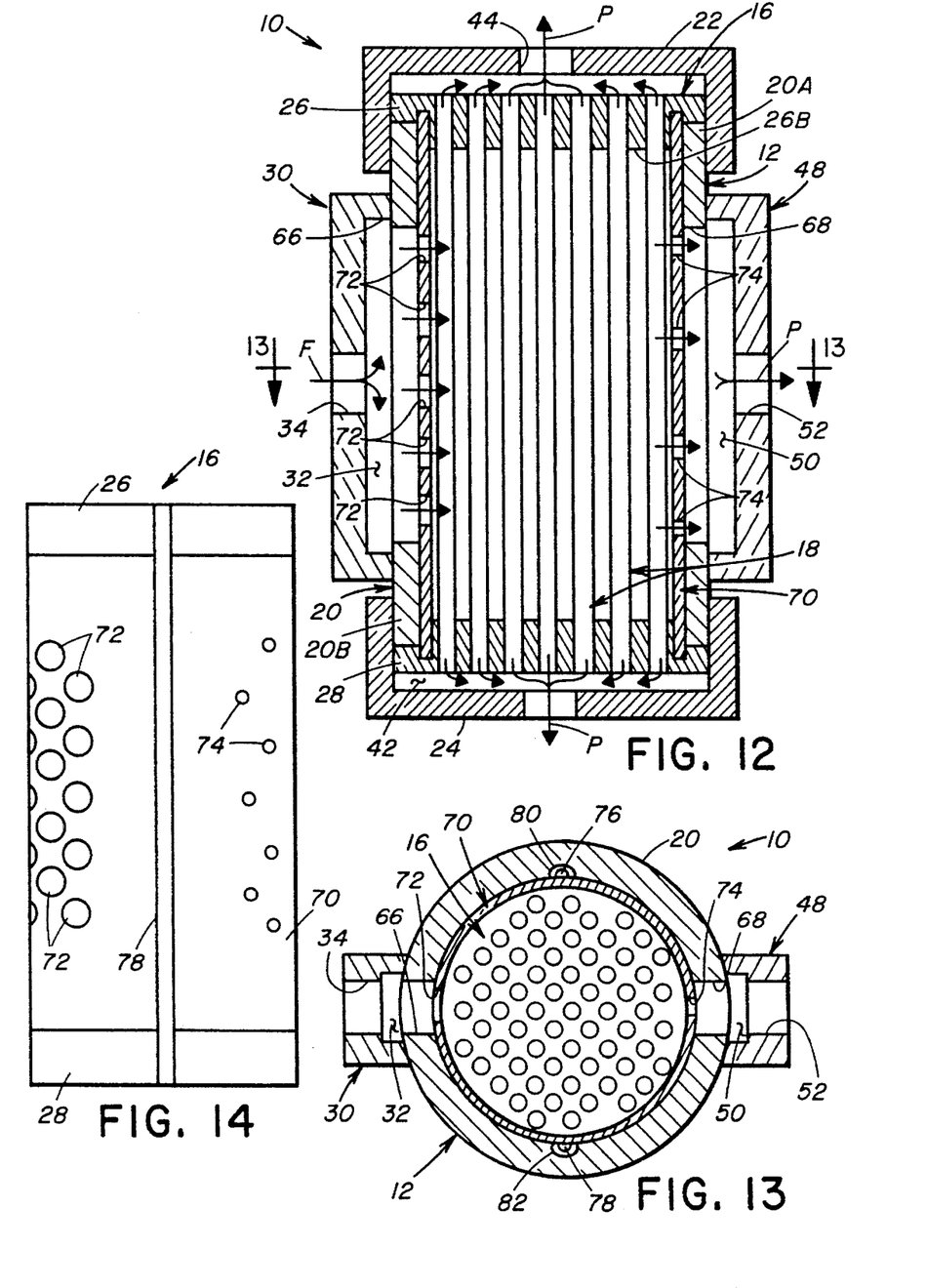
FIG. 12 is an axial sectional view of a fourth embodiment of a hollow fiber membrane gas separation module of the present invention.
FIG. 13 is a cross-sectional view of the fourth embodiment of the module taken along line 13—13 of FIG. 12.
FIG. 14 is a side elevational view of a hollow fiber membrane core used in the module of FIG. 12.

Referring to FIGS. 12–14, there is illustrated a fourth embodiment of the hollow fiber membrane gas separation module 10 of the present invention. In this embodiment, the respective inner perforations 36 and exit apertures 38 employed in the pressure vessel 12 of the first, second and third embodiments of the gas separation module 10 are now replaced by large windows 66, 68 formed in the opposite side portions 20C, 20D of the pressure housing 20. Instead, the core 16 is provided with an outer tubular sleeve 70 having pluralities of perforations 72 and apertures 74 defined with different diameters in opposite side portions of the tubular sleeve 70 which tailor the flow through the core 16 and around, past and in contact with the exterior surfaces 18A of the hollow fiber membranes 18 of the core 16. For example, as shown in FIG. 14, the perforations 72 have larger diameters than the aperture 74.

The fourth embodiment of the gas separation module 10 also includes a pair of barrier strips 76, 78 attached to other opposite side portions of the outer sleeve 70 of the core 16 which slidably fit into a pair of longitudinal recessed channels 80, 82 defined in the opposite interior portions of the pressure housing 20 and spaced between the large windows 66, 68 in the respective side portions 20C, 20D thereof. The interfitting of the barrier strips 76, 78 within the longitudinal channels 80, 82 when the core 16 is inserted into the pressure housing 20 will prevent the feed gas from flowing and escaping around the exterior of the core 16 along the interior surface of the pressure housing where the feed gas would by-pass the hollow fiber membranes 18 of the core. It can be readily understood that the core 16 of the fourth embodiment can either be a permanent part of the module 10 as in the case of the first and second embodiments or provided as a replaceable component as in the case of the third embodiment of the module.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A gas separation method, comprising the steps of:
   (a) providing an elongated pressure vessel having a pair of opposite ends and defining at least one permeate flow outlet therethrough at one of said opposite ends and an interior cavity formed between said opposite ends;
   (b) providing a core of hollow fiber membranes disposed in said interior cavity of said pressure vessel and including at least one end support member mounted across said one of said opposite ends of said pressure vessel and a multiplicity of hollow fiber membranes extending through said interior cavity of said pressure vessel, said hollow fiber membranes having short lengths falling within a range of from 3 to 60 centimeters and being of a type for separating gases, each of said hollow fiber membranes having at least one open end, a hollow interior bore communicating with said open end, and an exterior surface defining a membrane gas separation area within said interior cavity of said pressure vessel, said each hollow fiber membrane at said open end thereof being attached to said end support member such that said hollow interior bore of said each hollow fiber membrane is positioned in communication with said permeate flow outlet at said one end of said pressure vessel;
   (c) providing at least one feed manifold connected to and extending along a first side of said pressure vessel and defining a feed flow chamber therewith;
   (d) introducing a flow of feed gas in a first stream thereof into said feed flow chamber from externally of said feed manifold;
   (e) diverting the first stream into a plurality of second streams and introducing the second streams into said interior cavity of said pressure vessel from said feed flow chamber such that said second streams distribute the flow of feed gas throughout a greater volume of said interior cavity of said pressure vessel so as to produce a greater degree of mixing and contact of the flow of feed gas with said membrane gas separation areas defined by the exterior surfaces of said hollow fiber membrane than otherwise would be produced by said first stream introduced directly into said interior cavity;
   (f) producing a flow of a permeate portion of the feed gas in said interior bores of said hollow fiber membranes and discharging said flow of said permeate portion of the feed gas from said one end of said pressure vessel through said permeate flow outlet thereof; and
   (g) producing a flow of a retentate portion of the feed gas in said interior cavity of said pressure vessel about and outside of said hollow fiber membranes and discharging said flow of said retentate portion of the feed gas from a second side portion of said pressure vessel separate from said first side portion thereof.

2. The method of claim 1 further comprising the step of:
   providing a plurality of apertures in said second side portion of said pressure vessel spaced from said first side portion thereof, said apertures being of a size and number selected to provide sufficient back pressure to keep said pressure vessel pressurized at a desired feed gas flow rate into said pressure vessel.

3. The method of claim 1 further comprising:

providing a plurality of apertures in said second side portion of said pressure vessel spaced from said first side portion thereof; and providing at least one retentate manifold connected to and overlying said second side of said pressure vessel externally thereof and defining a retentate flow chamber therewith providing communication between said plurality of apertures in said second side portion of said pressure vessel and at least one outer aperture defined in said retentate manifold for discharging said flow of said retentate portion of the feed gas from said interior cavity through said plurality of apertures and then through said retentate flow chamber to externally of said retentate manifold such that the greater degree of mixing and contact of the feed gas flow with said membrane gas separation areas of said hollow fiber membranes produced by said inner perforations in said first side portion of said housing is better augmented by the discharging of retentate gas flow from said interior cavity through said plurality of apertures in said second side portion of said housing and then through said retentate flow chamber than would be augmented by the discharging of retentate gas flow directly from said interior cavity of said housing through said outer aperture in said retentate manifold.

4. The method of claim 1 wherein said providing said core includes providing hollow fiber membranes having short lengths falling within a range of from 3 to 30 centimeters.

5. The method of claim 1 wherein said providing said core includes providing hollow fiber membranes having short lengths falling within a range of from 3 to 20 centimeters.

6. The method of claim 1 wherein said providing said core includes providing a core being removable from said pressure vessel and replaceable back into said pressure vessel.

7. The method of claim 1 wherein said providing said core includes providing a core including a pair of said end support member mounted across said opposite ends of said pressure vessel and said multiplicity of hollow fiber membranes having opposite open ends being respectively attached to said pair of end support members.

8. The method of claim 7 wherein said providing said core also includes providing an elongated tubular sleeve having a multiplicity of perforations defined therein and extending between and connected at opposite ends with peripheral portions of said end support members.

9. The method of claim 7 wherein said providing said core also includes providing at least one elongated post extending between and connected at opposite ends with opposite portions of said end support members.

10. A hollow fiber membrane gas separation module, comprising:

(a) an elongated pressure vessel having a pair of opposite ends and an interior cavity formed between said opposite ends, at least one of said opposite ends defining an open region of said pressure vessel;

(b) a core of hollow fiber membranes disposed in said interior cavity of said pressure vessel, said core including at least one end support member mounted across said one end of said pressure vessel defining said open region thereof and a multiplicity of hollow fiber membranes extending through said interior cavity of said pressure vessel, said hollow fiber membranes having short lengths falling within a range of from 3 to 60 centimeters and being of a type for separating gases, each of said hollow fiber membranes having at least one open end, a hollow interior bore communicating with said open end and an exterior surface defining a membrane gas separation area within said interior cavity of said pressure vessel, said each hollow fiber membrane at said open end thereof being attached to said end support member such that said hollow interior bore of said each hollow fiber membrane is positioned in communication with said open region at said one end of said pressure vessel; and (c) means for guiding flow of feed gas under a predetermined pressure from externally of said pressure vessel into said interior cavity thereof and from said interior cavity thereof to externally of said pressure vessel such that the feed gas enters said interior cavity through a first side portion of said pressure vessel, flows across said interior cavity in transverse relation to said hollow fiber membranes therein and contacts said exterior surfaces of said hollow fiber membranes defining said membrane gas separation areas so as to produce a flow of a permeate portion of the feed gas exiting said pressure vessel through said open region at said one end thereof after traveling through said interior bores of said hollow fiber membranes and a flow of a retentate portion of the feed gas exiting said interior cavity through a second side portion of said pressure vessel separate from said first side portion thereof after traveling across said interior cavity outside of said hollow fiber membranes;

(d) said flow guiding means including at least one feed manifold connected to and extending along said first side portion of said pressure vessel and defining a feed flow chamber therewith, said feed manifold including an outer wall portion having at least one outer perforation defined therein for introducing the flow of feed gas in a first stream thereof into said feed flow chamber from externally of said pressure vessel, said feed manifold also including an inner wall portion having a plurality of inner perforations defined therein for diverting said first stream into a plurality of second streams and introducing said second streams into said interior cavity of said pressure vessel from said feed flow chamber of said feed manifold such that said second streams distribute the flow of feed gas throughout a greater volume of said interior cavity of said pressure vessel so as to produce a greater degree of mixing and contact of the flow of feed gas with said membrane gas separation areas defined by said exterior surfaces of said hollow fiber membranes than otherwise would be produced by said first stream introduced directly into said interior cavity.

11. The module of claim 10 wherein said pressure vessel has a circular cross-sectional shape.

12. The module of claim 10 wherein said pressure vessel has a polygonal cross-sectional shape.

13. The module of claim 10 wherein said flow guiding means includes a plurality of said feed manifolds.

14. The module of claim 10 wherein said flow guiding means also includes a plurality of apertures defined in said second side portion of said pressure vessel spaced from said first side portion thereof, said apertures being of a size and number selected to provide sufficient back pressure to keep said pressure vessel pressurized at a desired feed gas flow rate into said module.

15. The module of claim 10 wherein said flow guiding means includes:

a plurality of apertures defined in said second side portion of said pressure vessel spaced from said first side portion thereof; and at least one retentate manifold connected to and overlying said second side portion of said pressure vessel externally thereof, said retentate manifold defining a retentate flow chamber with said second side portion of said pressure vessel providing communication between said plurality of apertures in said second side portion of said housing and at least one outer aperture defined in said retentate manifold for discharging flow of retentate gas from said interior cavity through said plurality of apertures and then through said retentate flow chamber to externally of said retentate manifold such that the greater degree of mixing and contact of the feed gas flow with said membrane gas separation areas of said hollow fiber membranes produced by said inner perforations in said first side portion of said housing is better augmented by the discharging of retentate gas flow from said interior cavity through said plurality of apertures in said second side portion of said housing and then through said retentate flow chamber than would be augmented by the discharging of retentate gas flow directly from said interior cavity of said housing through said outer aperture in said retentate manifold.

16. The module of claim 15 wherein said second side portion of said pressure vessel and said retentate manifold connected thereto are located opposite from said first side portion of said pressure vessel and said feed manifold connected thereto.

17. The module of claim 15 wherein said flow guiding means includes a plurality of said retentate manifolds.

18. The module of claim 10 wherein:

said pressure vessel includes an elongated housing and a pair of end closures attached over said opposite ends of said housing; and said flow guiding means also includes a permeate flow chamber formed between at least one of said end closures and said at least one end support member of said core and a hole defined in said at least one of said end closures for exhausting flow of permeate gas from said interior bores of said hollow fiber membranes to externally of said pressure vessel.

19. A hollow fiber membrane gas separation module, comprising:

(a) an elongated pressure vessel having a pair of opposite ends and an interior cavity formed between said opposite ends, at least one of said opposite ends defining an open region of said pressure vessel;

(b) a core of hollow fiber membranes disposed in said interior cavity of said pressure vessel, said core including at least one end support member mounted across said one end of said pressure vessel defining said open region thereof and a multiplicity of hollow fiber membranes extending through said interior cavity of said pressure vessel, said hollow fiber membranes having short lengths falling within a range of from 3 to 30 centimeters and being of a type for separating gases, each of said hollow fiber membranes having at least one open end, a hollow interior bore communicating with said open end and an exterior surface defining a membrane gas separation area within said interior cavity of said pressure vessel, said each hollow fiber membrane at said open end thereof being attached to said end support member such that said hollow interior bore of said each hollow fiber membrane is positioned in communication with said open region at said one end of said pressure vessel; and (c) means for guiding flow of feed gas under a predetermined pressure from externally of said pressure vessel into said interior cavity thereof and from said interior cavity thereof to externally of said pressure vessel such that the feed gas enters said interior cavity through a first side portion of said pressure vessel, flows across said interior cavity in transverse relation to said hollow fiber membranes therein and contacts said exterior surfaces of said hollow fiber membranes defining said membrane gas separation areas so as to produce a flow of a permeate portion of the feed gas exiting said pressure vessel through said open region at said one end thereof after traveling through said interior bores of said hollow fiber membranes and a flow of a retentate portion of the feed gas exiting said interior cavity through a second side portion of said pressure vessel separate from said first side portion thereof after traveling across said interior cavity outside of said hollow fiber membranes;

(d) said flow guiding means including at least one feed manifold connected to and extending along said first side portion of said pressure vessel and defining a feed flow chamber therewith, said feed manifold including an outer wall portion having at least one outer perforation defined therein for introducing the flow of feed gas in a first stream thereof into said feed flow chamber from externally of said pressure vessel, said feed manifold also including an inner wall portion having a plurality of inner perforations defined therein for diverting said first stream into a plurality of second streams and introducing said second streams into said interior cavity of said pressure vessel from said feed flow chamber of said feed manifold such that said second streams distribute the flow of feed gas throughout a greater volume of said interior cavity of said pressure vessel so as to produce a greater degree of mixing and contact of the flow of feed gas with said membrane gas separation areas defined by said exterior surfaces of said hollow fiber membranes than otherwise would be produced by said first stream introduced directly into said interior cavity.

20. The module of claim 19 wherein said pressure vessel has a circular cross-sectional shape.

21. The module of claim 19 wherein said pressure vessel has a polygonal cross-sectional shape.

22. The module of claim 19 wherein said flow guiding means includes a plurality of said feed manifolds.

23. The module of claim 19 wherein said flow guiding means also includes a plurality of apertures defined in said second side portion of said pressure vessel spaced from said first side portion thereof, said apertures being of a size and number selected to provide sufficient back pressure to keep said pressure vessel pressurized at a desired feed gas flow rate into said module.

24. The module of claim 19 wherein said flow guiding means includes:

a plurality of apertures defined in said second side portion of said pressure vessel spaced from said first side portion thereof; and at least one retentate manifold connected to and overlying said second side portion of said pressure vessel externally thereof, said retentate manifold defining a retentate flow chamber with said second side portion of said pressure vessel providing communication between said plurality of apertures in said second side portion of said housing and at least one outer aperture defined in said retentate manifold for discharging flow of retentate gas from said interior cavity through said plurality of apertures and then through said retentate flow chamber to externally of said retentate manifold such that the greater degree of mixing and contact of the feed gas flow with said membrane gas separation areas of said hollow fiber membranes produced by said inner perforations in said first side portion of said housing is better augmented by the discharging of retentate gas flow from said interior cavity through said plurality of apertures in said second side portion of said housing and then through said retentate flow chamber than would be augmented by the discharging of retentate gas flow directly from said interior cavity of said housing through said outer aperture in said retentate manifold.

25. The module of claim 24 wherein said second side portion of said pressure vessel and said retentate manifold connected thereto are located opposite from said first side portion of said pressure vessel and said feed manifold connected thereto.

26. The module of claim 24 wherein said flow guiding means includes a plurality of said retentate manifolds.

27. The module of claim 19 wherein:

said pressure vessel includes an elongated housing and a pair of end closures attached over said opposite ends of said housing; and said flow guiding means also includes a permeate flow chamber formed between at least one of said end closures and said at least one end support member of said core and a hole defined in said at least one of said end closures for exhausting flow of permeate gas from said interior bores of said hollow fiber membranes to externally of said pressure vessel.

28. A hollow fiber membrane gas separation module, comprising:

(a) an elongated pressure vessel having a pair of opposite ends and an interior cavity formed between said opposite ends, at least one of said opposite ends defining an open region of said pressure vessel;

(b) a core of hollow fiber membranes disposed in said interior cavity of said pressure vessel, said core including at least one end support member mounted across said one end of said pressure vessel defining said open region thereof and a multiplicity of hollow fiber membranes extending through said interior cavity of said pressure vessel, said hollow fiber membranes having short lengths falling within a range of from 3 to 20 centimeters and being of a type for separating gases, each of said hollow fiber membranes having at least one open end, a hollow interior bore communicating with said open end and an exterior surface defining a membrane gas separation area within said interior cavity of said pressure vessel, said each hollow fiber membrane at said open end thereof being attached to said end support member such that said hollow interior bore of said each hollow fiber membrane is positioned in communication with said open region at said one end of said pressure vessel; and (c) means for guiding flow of feed gas under a predetermined pressure from externally of said pressure vessel into said interior cavity thereof and from said interior cavity thereof to externally of said pressure vessel such that the feed gas enters said interior cavity through a first side portion of said pressure vessel, flows across said interior cavity in transverse relation to said hollow fiber membranes therein and contacts said exterior surfaces of said hollow fiber membranes defining said membrane gas separation areas so as to produce a flow of a permeate portion of the feed gas exiting said pressure vessel through said open region at said one end thereof after traveling through said interior bores of said hollow fiber membranes and a flow of a retentate portion of the feed gas exiting said interior cavity through a second side portion of said pressure vessel separate from said first side portion thereof after traveling across said interior cavity outside of said hollow fiber membranes;

(d) said flow guiding means including at least one feed manifold connected to and extending along said first side portion of said pressure vessel and defining a feed flow chamber therewith, said feed manifold including an outer wall portion having at least one outer perforation defined therein for introducing the flow of feed gas in a first stream thereof into said feed flow chamber from externally of said pressure vessel, said feed manifold also including an inner wall portion having a plurality of inner perforations defined therein for diverting said first stream into a plurality of second streams and introducing said second streams into said interior cavity of said pressure vessel from said feed flow chamber of said feed manifold such that said second streams distribute the flow of feed gas throughout a greater volume of said interior cavity of said pressure vessel so as to produce a greater degree of mixing and contact of the flow of feed gas with said membrane gas separation areas defined by said exterior surfaces of said hollow fiber membranes than otherwise would be produced by said first stream introduced directly into said interior cavity.

29. The module of claim 28 wherein said pressure vessel has a circular cross-sectional shape.

30. The module of claim 28 wherein said pressure vessel has a polygonal cross-sectional shape.

31. The module of claim 28 wherein said flow guiding means includes a plurality of said feed manifolds.

32. The module of claim 28 wherein said flow guiding means also includes a plurality of apertures defined in said second side portion of said pressure vessel spaced from said first side portion thereof, said apertures being of a size and number selected to provide sufficient back pressure to keep said pressure vessel pressurized at a desired feed gas flow rate into said module.

33. The module of claim 28 wherein said flow guiding means includes:

a plurality of apertures defined in said second side portion of said pressure vessel spaced from said first side portion thereof; and at least one retentate manifold connected to and overlying said second side portion of said pressure vessel externally thereof, said retentate manifold defining a retentate flow chamber with said second side portion of said pressure vessel providing communication between said plurality of apertures in said second side portion of said housing and at least one outer aperture defined in said retentate manifold for discharging flow of retentate gas from said interior cavity through said plurality of apertures and then through said retentate flow chamber to externally of said retentate manifold such that the greater degree of mixing and contact of the feed gas flow with said membrane gas separation areas of said hollow fiber membranes produced by said inner perforations in said first side portion of said housing is better augmented by the discharging of retentate gas flow from said interior cavity through said plurality of apertures in said second side portion of said housing and then through said retentate flow chamber than would be augmented by the discharging of retentate gas flow directly from said interior cavity of said housing through said outer aperture in said retentate manifold.

34. The module of claim 33 wherein said second side portion of said pressure vessel and said retentate manifold connected thereto are located opposite from said first side portion of said pressure vessel and said feed manifold connected thereto.

35. The module of claim 33 wherein said flow guiding means includes a plurality of said retentate manifolds.

36. The module of claim 28 wherein:

said pressure vessel includes an elongated housing and a pair of end closures attached over said opposite ends of said housing; and said flow guiding means also includes a permeate flow chamber formed between at least one of said end closures and said at least one end support member of said core and a hole defined in said at least one of said end closures for exhausting flow of permeate gas from said interior bores of said hollow fiber membranes to externally of said pressure vessel.

37. A hollow fiber membrane gas separation module, comprising:

(a) a pressure vessel including an elongated housing having a pair of opposite ends and an interior cavity formed between said opposite ends, said opposite ends defining open end regions of said housing, said pressure vessel also including a pair of end closures attached to said opposite ends of said housing across said open end regions thereof, at least one of said end closures being removably attached to one of said ends of said housing;

(b) a core of hollow fiber membranes disposed in said interior cavity of said pressure vessel and being removable from said housing through said one of said ends thereof by removal of said one end closure, said core including at least one end support member removably mounted across said one of said ends of said pressure vessel defining one of said open end regions thereof and a multiplicity of hollow fiber membranes extending through said interior cavity of said pressure vessel, said hollow fiber membranes having short lengths falling within a range of from 3 to 60 centimeters and being of a type for separating gases, each of said hollow fiber membranes having at least one open end, a hollow interior bore communicating with said open end and an exterior surface defining a membrane gas separation area within said interior cavity of said pressure vessel, said each hollow fiber membrane at said open end thereof being attached to said end support member such that said hollow interior bore of said each hollow fiber membrane is positioned in communication with said one open end region at said one end of said pressure vessel; and (c) means for guiding flow of feed gas under a predetermined pressure from externally of said pressure vessel into said interior cavity thereof and from said interior cavity thereof to externally of said pressure vessel such that the feed gas enters said interior cavity through a first side portion of said housing of said pressure vessel, flows through said interior cavity and contacts said exterior surfaces of said hollow fiber membranes defining said membrane gas separation areas so as to produce a flow of a permeate portion of the feed gas exiting one of said end closures of said pressure vessel through said one open end region at said one end of said housing after traveling through said interior bores of said hollow fiber membranes of said core and a flow of a retentate portion of the feed gas exiting said interior cavity through a second side portion of said housing of said pressure vessel separate from said first side portion thereof after traveling across said interior cavity outside of said hollow fiber membranes, said one of said end closures containing a hole for exhausting the flow of permeate gas from said interior bores of said hollow fiber membranes of said core.

38. The module of claim 37 wherein said one end closure is threadably attached to said one end of said housing.

39. The module of claim 37 further comprising:

means disposed in said one end of said housing for creating a seal between said core and said housing and for creating a seal between said removable end closure and said housing.

40. The module of claim 37 wherein said core includes:

a pair of said end support members each having an external side and an internal side, each of said hollow fiber membranes at said opposite open ends thereof being attached to said end support members such that said hollow fiber membrane extends between said internal sides of said end support members and said interior bore of said hollow fiber membrane is provided in communication with said external side of said end support members; and an elongated substantially rigid support structure extending between and connected at opposite ends to said end support members so as to position said end support members in a predetermined fixed spaced relationship from one another with said hollow fiber membranes extending therebetween.

41. The module of claim 40 wherein said hollow fiber membranes have short lengths falling within a range of from 3 to 30 centimeters.

42. The module of claim 40 wherein said hollow fiber membranes have short lengths falling within a range of from 3 to 20 centimeters.

43. The module of claim 40 wherein said rigid support structure is an elongated tubular sleeve having a multiplicity of perforations defined therein and extending between and connected at opposite ends with peripheral portions of said end support members.

44. The module of claim 40 wherein said rigid support structure is at least one elongated post extending between and connected at opposite ends with opposite portions of said end support members.

45. The module of claim 37 wherein said means for guiding flow of feed gas guides said flow across said interior cavity of said pressure vessel in transverse relation to said hollow fiber membranes therein.

46. A pressure vessel for a gas separation module, comprising:

(a) an elongated pressure housing having a pair of opposite ends and an interior cavity formed between said opposite ends, said opposite ends defining open regions;

(b) first means for guiding a flow of feed gas from externally of said pressure housing into said interior cavity thereof, said first means for guiding feed gas flow including at least one feed manifold connected to and extending along a first side portion of said pressure housing and defining a feed flow chamber therewith, said feed manifold including an outer wall portion having at least one outer perforation defined therein for introducing the flow of feed gas in a first stream thereof into said feed flow chamber from externally of said pressure housing, said feed manifold also including an inner wall portion having a plurality of inner perforations defined therein for diverting said first stream into a plurality of second streams and introducing said second streams into said interior cavity of said pressure housing from said feed flow chamber of said feed manifold such that said second streams produce distribution of the flow of feed gas throughout a greater volume of said interior cavity of said pressure housing than would be produced by said first stream introduced directly into said interior cavity;

(c) second means for guiding flow of retentate gas from said interior cavity of said pressure housing to externally thereof; and (d) third means for guiding flow of permeate gas from said interior cavity of said pressure housing to externally thereof.

47. The vessel of claim 46 wherein said housing has a circular cross-sectional shape.

48. The vessel of claim 46 wherein said housing has a polygonal cross-sectional shape.

49. The vessel of claim 46 wherein said first means includes a plurality of said feed manifolds.

50. The vessel of claim 46 wherein said second means includes a plurality of apertures defined in a second side portion of said pressure housing spaced from said first side portion thereof, said apertures being of a size and number selected to provide sufficient back pressure to keep said pressure housing pressurized at a desired feed gas flow rate into said module.

51. The module of claim 46 wherein said second means includes:

a plurality of apertures defined in a second side portion of said pressure housing spaced from said first side portion thereof; and at least one retentate manifold connected to and overlying said second side portion of said pressure housing externally thereof, said retentate manifold defining a retentate flow chamber with said second side portion of said pressure housing providing communication between said plurality of apertures in said second side portion of said housing and at least one outer aperture defined in said retentate manifold for discharging flow of retentate gas from said interior cavity through said plurality of apertures and then through said retentate flow chamber to externally of said retentate manifold such that the distribution of the flow of feed gas throughout the greater volume of said interior cavity of said pressure housing produced by said inner perforations in said first side portion of said housing is better augmented by the discharging of retentate gas flow from said interior cavity through said plurality of apertures in said second side portion of said housing and then through said retentate flow chamber than would be augmented by the discharging of retentate gas flow directly from said interior cavity of said housing through said outer aperture in said retentate manifold.

52. The vessel of claim 51 wherein said second side portion of said housing and said retentate manifold connected thereto are located opposite from said first side portion of said housing and said feed manifold connected thereto.

53. The vessel of claim 51 wherein said second means includes a plurality of said retentate manifolds.

54. The vessel of claim 46 wherein said third means includes a pair of end closures attached over said opposite ends of said housing, at least one of said end closures containing a hole for exhausting flow of permeate gas from said interior cavity of said housing.

55. A replaceable hollow fiber membrane core for a gas separation module, comprising:

(a) a pair of end support members each having an exterior side and an interior side;

(b) a multiplicity of hollow fiber membranes having short lengths falling within a range of from 3 to 60 centimeters and being of a type for separating gases, each of said hollow fiber membranes having an exterior surface defining a membrane gas separation area, a pair of opposite open ends, and a hollow interior bore extending between and communicating with said opposite open ends, each of said hollow fiber membranes at said opposite open ends being attached to said end support members such that said hollow fiber membrane extends between said interior sides of said end support members and said interior bore of said hollow fiber membrane is provided in communication with said exterior sides of said end support members; and (c) an elongated substantially rigid structure extending between and connected at opposite ends to said end support members so as to position said end support members in a predetermined spaced relationship from one another with said hollow fiber membranes extending therebetween, said rigid support structure being an elongated tubular sleeve having first and second opposite side portions and a multiplicity of perforations defined in said first opposite side portion and a multiplicity of apertures defined in said second opposite side portions, said elongated tubular sleeve extending between and connected at opposite ends with peripheral portions of said end support members, said perforations defined in said first opposite side portion of said elongated tubular sleeve having diameters which are different from the diameters of said apertures defined in said second opposite side portion thereof.

56. The core of claim 55 wherein said hollow fiber membranes have short lengths falling within a range of from 3 to 30 centimeters.

57. The core of claim 55 wherein said hollow fiber membranes have short lengths falling within a range of from 3 to 20 centimeters.

58. The core of claim 55 wherein said rigid support structure is at least one elongated post extending between and connected at opposite ends with opposite portions of said end support members.

59. A hollow fiber membrane gas separation module, comprising:

(a) a pressure vessel including an elongated housing having a pair of opposite ends and an interior cavity formed between said opposite ends, said opposite ends defining open end regions of said housing, said pressure vessel also including a pair of end closures attached to said opposite ends of said housing across said open end regions thereof;

(b) a core of hollow fiber membranes disposed in said interior cavity of said pressure vessel, said core including a pair of end support members each having an exterior side and an interior side and being mounted across one of said opposite ends of said pressure housing and a multiplicity of hollow fiber membranes extending through said interior cavity of said pressure housing, said hollow fiber membranes having short lengths falling within a range of from 3 to 60 centimeters and being of a type for separating gases, each of said hollow fiber membranes having a pair of opposite open ends, a hollow interior bore communicating with said open ends, and an exterior surface defining a membrane gas separation area within said interior cavity of said pressure housing, said each hollow fiber membrane at said open ends thereof being attached to said end support members such that said hollow fiber membrane extends between said interior sides of said end support members and said hollow interior bore is positioned in communication with said exterior sides of said end support members and said open end regions at said opposite ends of said pressure housing, said core also including an elongated outer tubular sleeve surrounding said multiplicity of hollow fiber membranes and extending between and connected at opposite ends with peripheral portions of said end support members;

(c) first means for guiding a flow of feed gas from and back to externally of said pressure housing and into and from said interior cavity thereof, said first means including at least one feed manifold connected to and extending along a first side portion of said pressure housing and defining a feed flow chamber therewith, said feed manifold having at least one outer perforation defined therein for introducing the flow of feed gas in a first stream thereof into said feed flow chamber from externally of said feed manifold, said first means also including windows defined in said first and second side portions of said pressure housing for introducing said feed gas flow into and discharging said feed gas flow from said interior cavity; and (d) second means for guiding flow of feed gas through said core in said interior cavity, said second means including a plurality of perforations defined in a first side portion of said tubular sleeve of said core and at least one aperture defined in a second side portion of said tubular sleeve being separate from said first side portion thereof, said plurality of perforations and said at least one aperture being of respective sizes and numbers to tailor the flow of feed gas through said core and around, past and in contact with said exterior surfaces of said hollow fiber membranes so as to produce distribution of the flow of feed gas throughout a greater volume of said interior cavity of said pressure vessel than would be produced by the flow of feed gas directly into said interior cavity from said feed manifold.

60. The module of claim 59 also comprising:

a pair of barrier strips attached to other spaced side portions of said outer tubular sleeve of said core for slidably fitting into a pair of longitudinally extending channels defined in spaced interior portions of said pressure housing and spaced between said windows so as to prevent feed gas from flowing and escaping around the exterior of said core along the interior surface of said pressure housing and thereby by-passing said hollow fiber membranes of said core.

61. The module of claim 59 further comprising:

third means for guiding flow of feed gas which includes at least one retentate manifold connected to and overlying said second side portion of said pressure housing externally thereof, said retentate manifold defining a retentate flow chamber with said second side portion of said pressure housing providing communication of said plurality of apertures in said second side portion of said tubular sleeve of said core with at least one outer aperture defined in said retentate manifold for discharging flow of retentate gas from said interior cavity through said plurality of apertures and then through said retentate flow chamber to externally of said retentate manifold.

62. The module of claim 59 wherein one of said end closures is removably attached to one of said ends of said housing.

63. The module of claim 62 wherein said core is removably and replaceably mounted in said interior cavity of said pressure housing through said one end thereof.

64. The module of claim 63 further comprising:

means disposed in said one end of said housing for creating a seal between said core and said housing and for creating a seal between said removable end closure and said housing.

65. The module of claim 59 wherein said hollow fiber membranes have short lengths falling within a range of from 3 to 30 centimeters.

66. The module of claim 59 wherein said hollow fiber membranes having short lengths falling within a range of from 3 to 20 centimeters.

67. A hollow fiber membrane gas separation module, comprising:

(a) a pressure vessel including an elongated housing having a pair of opposite ends and an interior surface surrounding an interior cavity formed in said housing between said opposite ends, said opposite ends defining open end regions of said housing, said pressure vessel also including a pair of end closures attached to said opposite ends of said housing across said open end regions thereof;

(b) a core of hollow fiber membranes disposed in said interior cavity of said housing, said core including a pair of end support members each having an exterior side and an interior side and being mounted across one of said opposite ends of said housing and a multiplicity of hollow fiber membranes extending through said interior cavity of said housing, said hollow fiber membranes having short lengths falling within a range of from 3 to 60 centimeters and being of a type for separating gases, each of said hollow fiber membranes having a pair of opposite open ends, a hollow interior bore communicating with said open ends, and an exterior surface defining a membrane gas separation area within said interior cavity of said housing, said each hollow fiber membrane at said open ends thereof being attached to said end support members such that said hollow fiber membrane extends between said interior sides of said end support members and said hollow interior bore is positioned in communication with said exterior sides of said end support members and said open end regions at said opposite ends of said housing, said core also including an elongated outer tubular sleeve surrounding said multiplicity of hollow fiber membranes and extending between and connected at opposite ends with peripheral portions of said end support members;

(c) first means for guiding a flow of feed gas from and back to externally of said housing and into and from said interior cavity thereof, said first guiding means connected to and extending along a first side portion of said housing for introducing the flow of feed gas into said feed flow chamber from externally of said housing and from said feed flow chamber into said interior cavity and for discharging said feed gas flow from said interior cavity;

(d) second means for guiding flow of feed gas through said core in said interior cavity, said second means including a plurality of perforations defined in a first side portion of said tubular sleeve of said core and a plurality of apertures defined in a second side portion of said tubular sleeve being separate from said first side portion thereof, said perforations and apertures being of respective sizes and numbers to tailor the flow of feed gas through said core and around, past and in contact with said exterior surfaces of said hollow fiber membranes so as to produce distribution of the flow of feed gas substantially throughout said interior cavity; and (e) means defined on said housing and other side portions of said outer tubular sleeve of said core disposed between said first and second side portions thereof for creating barriers to prevent feed gas from flowing and escaping around the exterior of said core along an interior surface of said housing and thereby by-passing said hollow fiber membranes of said core.

68. The module of claim 67 wherein said means for creating barriers includes a pair of barrier strips attached to one of said housing and said other spaced side portions of said outer tubular sleeve of said core.

69. The module of claim 68 wherein said means for creating barriers includes a pair of longitudinally extending channels defined in the other of said housing and said other side portions of said outer tubular sleeve of said core for slidably receiving respective ones of said barrier strips therewith.

* * * * *